US010696356B2

(12) United States Patent
Chen et al.

(10) Patent No.: US 10,696,356 B2
(45) Date of Patent: Jun. 30, 2020

(54) DRIVING DEVICE FOR A HUB ASSEMBLY

(71) Applicant: Destiny Racing (Huaian) International Co., Ltd., Huaian, Jiangsu Province (CN)

(72) Inventors: Yen-Yu Chen, Taichung (TW); Yen-Shen Chen, Taichung (TW); Yen-Ching Chen, Taichung (TW)

(73) Assignee: Destiny Racing (Huaian) International Co., Ltd., Huaian (CN)

( * ) Notice: Subject to any disclaimer, the term of this patent is extended or adjusted under 35 U.S.C. 154(b) by 0 days.

(21) Appl. No.: 16/120,689

(22) Filed: Sep. 4, 2018

(65) Prior Publication Data

US 2019/0233053 A1 Aug. 1, 2019

(30) Foreign Application Priority Data

Jan. 31, 2018 (TW) ............................. 107103387 A

(51) Int. Cl.
*F16D 41/12* (2006.01)
*B62M 9/02* (2006.01)
(Continued)

(52) U.S. Cl.
CPC ............... *B62M 9/02* (2013.01); *B60B 30/02* (2013.01); *B60B 30/10* (2013.01); *B60B 33/0084* (2013.01); *B60B 33/0092* (2013.01); *B60B 33/021* (2013.01); *F16D 41/12* (2013.01); *F16H 7/06* (2013.01); *B60Y 2200/81* (2013.01); *B60Y 2200/83* (2013.01)

(58) Field of Classification Search
CPC ............ F16D 41/12; F16D 7/06; F16D 41/30; B62M 9/02
See application file for complete search history.

(56) References Cited

U.S. PATENT DOCUMENTS 1,955,200 A * 4/1934 Millican ................. F16D 41/00
192/46
2,143,121 A * 1/1939 Cox ......................... F16D 41/12
192/43.1
(Continued)

FOREIGN PATENT DOCUMENTS

DE 2721551 A1 * 11/1978 .............. B62M 9/02
TW M397918 U 2/2011

OTHER PUBLICATIONS

Search Report appended to an Office Action issued to Taiwanese counterpart application No. 107103387 by the TIPO dated Sep. 20, 2018, with an English translation thereof.

*Primary Examiner* — Stacey A Fluhart
(74) *Attorney, Agent, or Firm* — Burris Law, PLLC

(57) ABSTRACT

A driving device for use in a hub assembly includes a stationary ring, a connecting seat and a pawl unit, all of which surround an axis. The stationary ring has a plurality of angularly spaced-apart ratchet grooves that are symmetric. The connecting seat has a sprocket and at least one connecting portion, both of which are arranged along the axis. The pawl unit includes a ring-shaped coupling seat that is removably sleeved on the connecting seat and that has at least one coupling portion engaging removably the at least one connecting portion, and a plurality of angularly spaced-apart retaining grooves, each retaining a pawl and a resilient member for engaging a corresponding one of the ratchet grooves of the stationary ring.

2 Claims, 5 Drawing Sheets

(51) Int. Cl.
  *B60B 33/00*  (2006.01)
  *B60B 30/02*  (2006.01)
  *B60B 33/02*  (2006.01)
  *B60B 30/10*  (2006.01)
  *F16H 7/06*  (2006.01)

(56) References Cited

U.S. PATENT DOCUMENTS

| | | | | |
|---|---|---|---|---|
| 5,895,336 | A * | 4/1999 | Yoo | B62M 3/003 |
| | | | | 280/238 |
| 2007/0199877 | A1* | 8/2007 | Rodgers | B01D 61/18 |
| | | | | 210/321.6 |
| 2010/0044180 | A1* | 2/2010 | Chen | F16D 41/30 |
| | | | | 192/64 |
| 2010/0252389 | A1* | 10/2010 | French | F16D 41/24 |
| | | | | 192/64 |
| 2014/0166421 | A1 | 6/2014 | Chen | |
| 2015/0342114 | A1* | 12/2015 | Finlayson | A01C 19/04 |
| | | | | 111/177 |
| 2016/0186821 | A1* | 6/2016 | Alley | F16D 41/30 |
| | | | | 192/45.1 |

* cited by examiner

DRIVING DEVICE FOR A HUB ASSEMBLY

CROSS-REFERENCE TO RELATED APPLICATION

This application claims priority of Taiwanese Patent Application No. 107103387, filed on Jan. 31, 2018.

FIELD

The disclosure relates to a driving device, and more particularly to a driving device for a hub assembly.

BACKGROUND

Taiwanese Utility Model Patent No. M365850 discloses a conventional driving device for a hub assembly of a bicycle. The driving device includes a stationary ring that is mounted fixedly in the hub assembly, a ratchet ring, and a pawl seat. The ratchet ring is removably engaged with the stationary ring, and has an inner ring surface that is formed with a plurality of angularly spaced-apart ratchet grooves. The ratchet grooves are uniform but asymmetrical.

The pawl seat is connected to a sprocket in a manner that the pawl seat and the sprocket are molded as one piece. The pawl seat has an outer surrounding surface, and a retaining unit formed in the outer surrounding surface.

The retaining unit has a plurality of angularly spaced-apart retaining grooves. Each of the retaining grooves has a central section that has an opening, and first and second retaining sections that are connected respectively to circumferentially opposite ends of the central section. For each of the retaining grooves, the first retaining section is engaged with a pawl member that has a claw end extending through the opening, and the second retaining section retains a resilient member for biasing the claw end of the pawl member to engage a corresponding one of the ratchet grooves of the ratchet ring such that the ratchet ring is rotatable only in a single direction.

In order to enable the ratchet ring to rotate in the opposite direction instead, the ratchet ring has to be removed from, and then reengaged with the stationary ring at a flipped orientation, and the pawl member and the resilient member in each of retaining grooves have to switch places to engage with the flipped ratchet ring properly. The need to disassemble and reassemble the driving device for the purpose of changing rotational direction is rather cumbersome.

SUMMARY

Therefore, an object of the disclosure is to provide a driving device that can alleviate the drawback of the prior art.

According to the disclosure, the driving device adapted for use in a hub assembly includes a stationary ring, a connecting seat, and a pawl unit. The stationary ring is adapted to be mounted fixedly in the hub assembly, and has an inner ring surface that surrounds an axis and that defines an inner ring hole, and a plurality of angularly spaced-apart ratchet grooves that are formed in the inner ring surface and that are in spatial communication with the inner ring hole. Each of the ratchet grooves has an outline that is symmetrical with respect to a plane extending from the axis through a central axis of the ratchet groove.

The connecting seat has a surrounding wall that surrounds the axis, and that has an outer surrounding surface, a sprocket that surrounds and is connected to the surrounding wall, and at least one connecting portion that is formed on the outer surrounding surface of the surrounding wall. The at least one connecting portion and the sprocket are arranged along the axis.

The pawl unit includes a ring-shaped coupling seat, a plurality of pawls, and a plurality of resilient members. The coupling seat is removably sleeved on the connecting seat, and has an internal surrounding surface surrounding the axis, an external surrounding surface opposite to the internal surrounding surface, at least one coupling portion formed on the internal surrounding surface, and a plurality of angularity spaced-apart retaining grooves formed on the external surrounding surface. The at least one coupling portion engages removably the at least one connecting portion of the connecting seat. Each of the retaining grooves has a central section that has an opening, and first and second retaining sections that are connected respectively to circumferentially opposite ends of the central section. Each of the pawls has an engaging end that engages rotatably the first retaining section of a respective one of the retaining grooves of the coupling seat, and a claw end that is opposite to the engaging end and that extends through the opening of the respective one of the retaining grooves. Each of the resilient members is disposed in the second retaining section of a respective one of the retaining grooves for biasing the claw end of a respective one of the pawls to engage a corresponding one of the ratchet grooves of the stationary ring.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
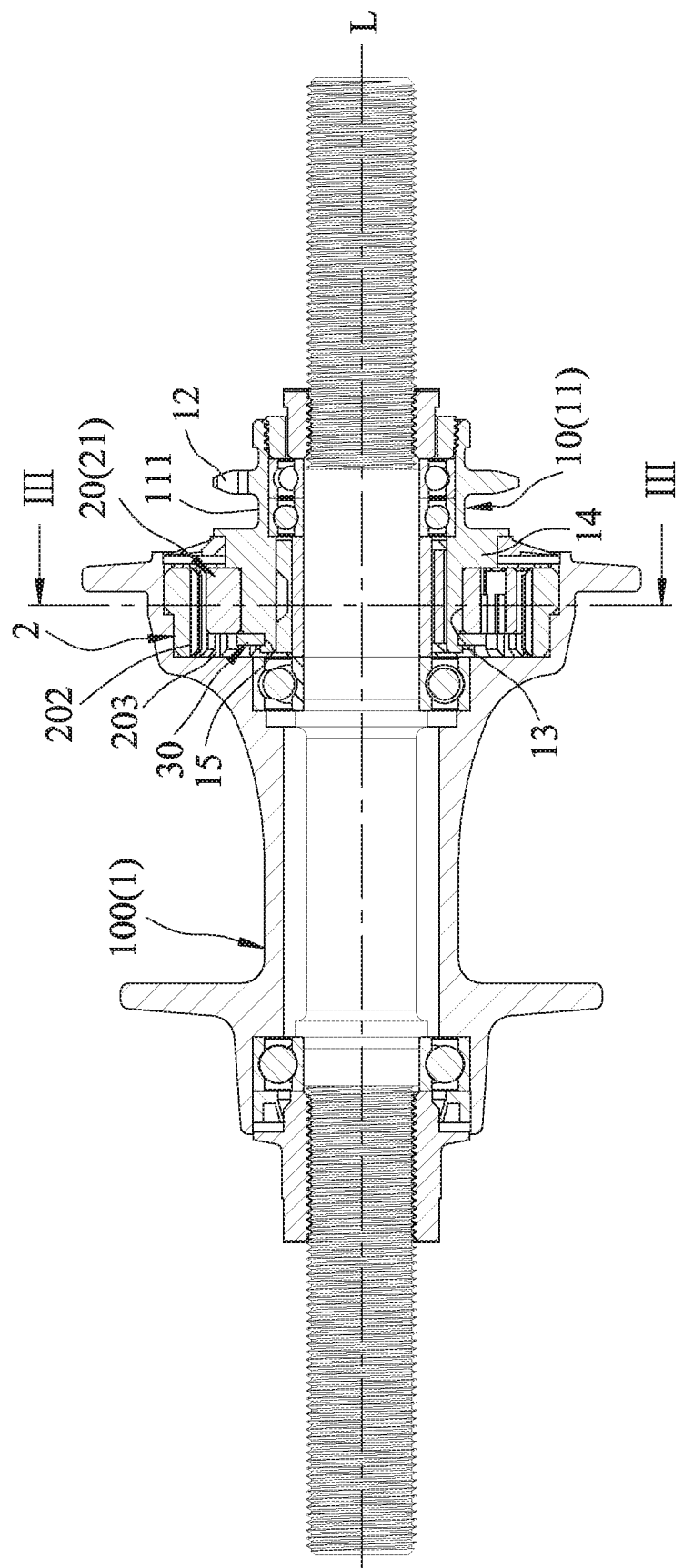
FIG. 1 is a sectional view of an embodiment of a driving device according to the disclosure mounted fixedly in a hub assembly in a right-handed drive mode.
Figure 2:
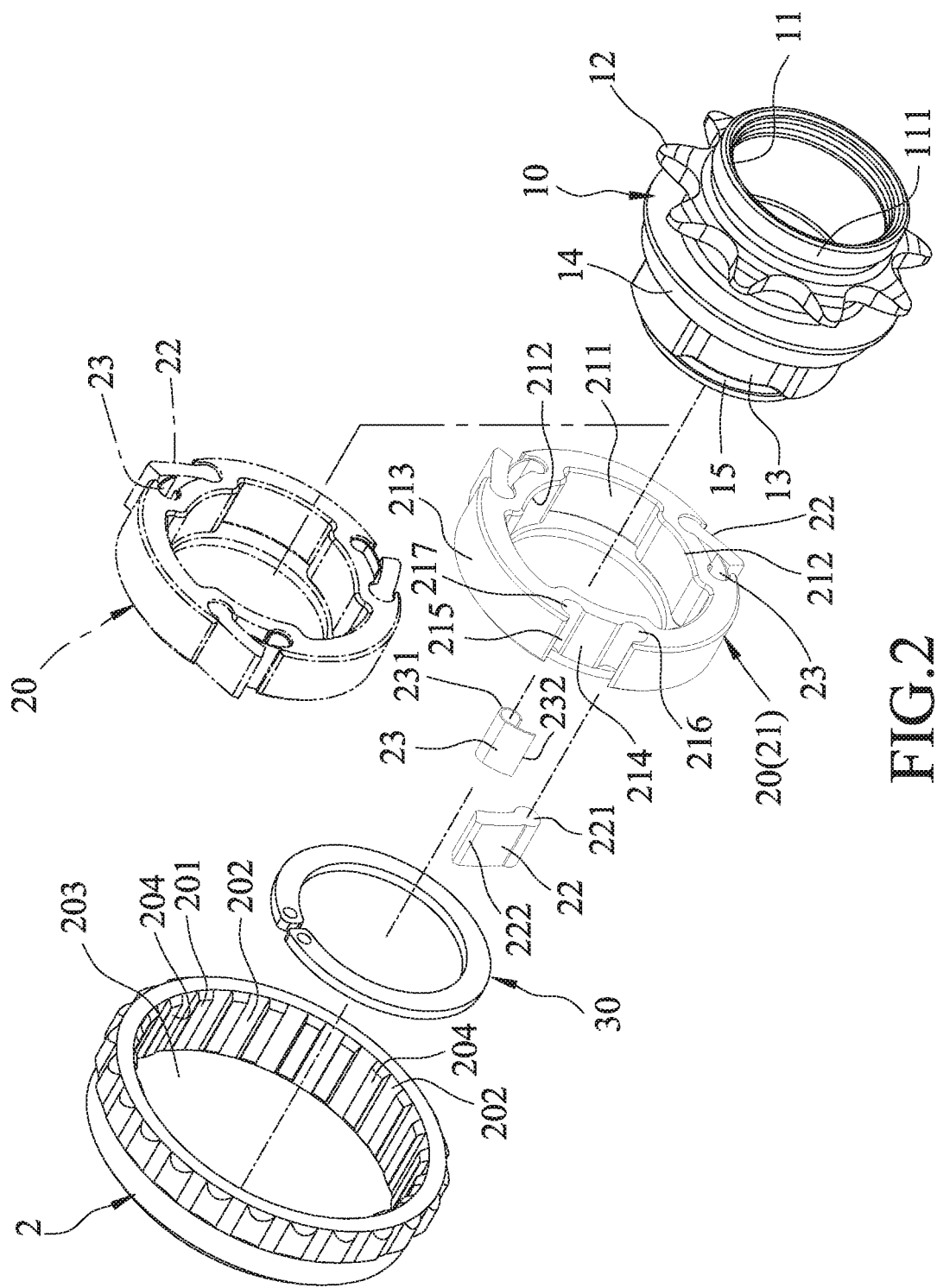
FIG. 2 is an exploded perspective view of the embodiment.

Referring to FIGS. 1 and 2, an embodiment of a driving device according to the disclosure is adapted for use in a hub assembly 100 that includes a hub shell 1 surrounding an axis (L). The driving device includes a stationary ring 2 adapted to be mounted fixedly in the hub shell 1, a connecting seat 10, a pawl unit 20 and a C-ring 30.

The stationary ring 2 has an inner ring surface 201 that surrounds an axis (L) and that defines an inner ring hole 203, a plurality of angularly spaced-apart ratchet grooves 202 that are formed in the inner ring surface 201 and that are in spatial communication with the inner ring hole 203, and a plurality of ratchet teeth 204. Each of the ratchet teeth 204 is formed between a respective adjacent pair of the ratchet grooves 202 (i.e., the ratchet grooves 202 and the ratchet teeth 204 are alternately arranged). Each of the ratchet grooves 202 has an outline that is symmetrical with respect to a plane extending from the axis (L) through a central axis of the ratchet groove 202.

In this embodiment, the connecting seat 10 has a surrounding wall 11 that surrounds the axis (L) and that has an outer surrounding surface 111, a sprocket 12 that surrounds and is connected to the surrounding wall 11, and a plurality of angularly spaced-apart connecting portions 13 (see FIG. 3) that are formed on the outer surrounding surface 111 of the surrounding wall 11 and that are configured as recesses. The connecting portions 13 and the sprocket 12 are arranged along the axis (L), such that an end of the connecting seat 10 proximate to the connecting portions 13 may extend into the inner ring hole 203 of the stationary ring 2 and the hub assembly 100, and an end of the connecting seat 10 proximate to the sprocket 12 is located outside of the hub assembly 100.

The connecting seat 10 further has an abutment ring 14 that surrounds and is connected to the surrounding wall 11 and that is disposed between the connecting portion 13 and the sprocket 12, and a ring groove 15 that is formed in the outer surrounding surface 111 of the surrounding wall 11, and that is disposed at a side of the connecting portions 13 opposite to the abutment ring 14 along the axis (L). The C-ring 30 is removably retained in the ring groove 15.

The pawl unit 20, when in use, is positioned between the C-ring 30 and the abutment ring 14 of the connecting seat 10. The pawl unit 20 includes a ring-shaped coupling seat 21, a plurality of pawls 22, and a plurality of resilient members 23.

In this embodiment, the coupling seat 21 is removably sleeved on the connecting seat 10 and has an internal surrounding surface 211 that surrounds the axis (L), an external surrounding surface 213 that is opposite to the internal surrounding surface 211, a plurality of coupling portions 212 that are formed on the internal surrounding surface 211 and that engage removably and respectively the connecting portions 13 of the connecting seat 10, and a plurality of angularly spaced-apart retaining grooves 214 (see FIG. 3) formed in the external surrounding surface 213. In this embodiment, each of the coupling portions 212 of the pawl unit 20 is configured as a protrusion and is radially aligned with a respective one of the retaining grooves 214. Each of the retaining grooves 214 has a central section that has an opening 215, and first and second retaining sections 216, 217 that are connected respectively to circumferentially opposite ends of the central section.

Each of the pawls 22 has an engaging end 221 that engages rotatably the first retaining section 216 of a respective one of the retaining grooves 214 of the coupling seat 21, and a claw end 222 that is opposite to the engaging end 221 and that extends through the opening 215 of the respective one of the retaining grooves 214. Each of the resilient members 23 has a curled end 231 that is fittingly disposed in the second retaining section 217 of a respective one of the retaining grooves 214, and a biasing end 232 for biasing the claw end 222 of a respective one of the pawls 22 to engage a corresponding one of the ratchet grooves 202 of the stationary ring 2.

Figure 3:
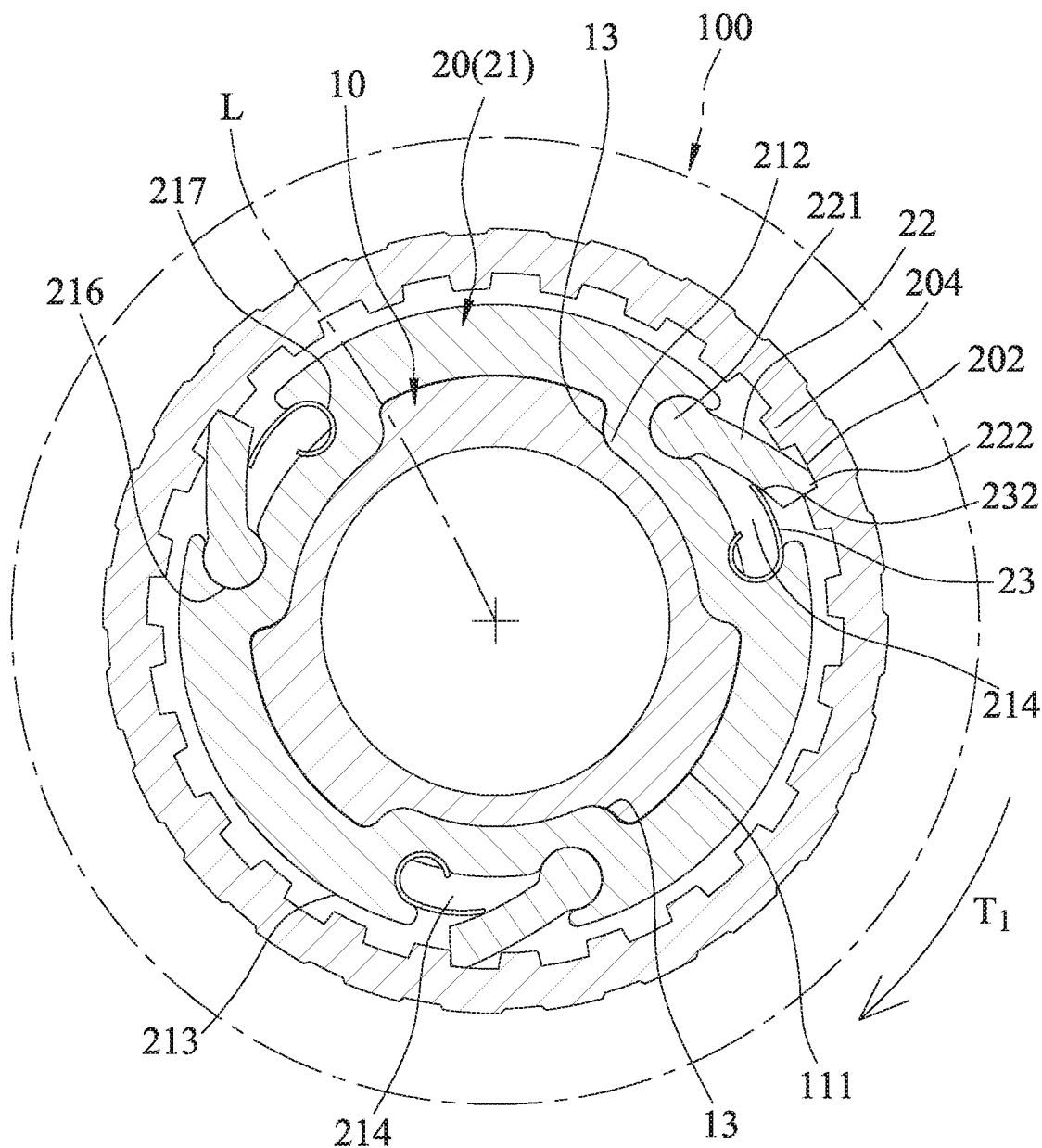
FIG. 3 is a sectional view taken along line III-III in FIG. 1.

Referring to FIGS. 1 and 3, the driving device is used in a hub assembly 100 in a right-handed drive mode, in which the stationary ring 2 is disposed on the right side of the hub assembly 100. The coupling portions 212 of the coupling seat 21 of the pawl unit 20 removably and respectively engage the connecting portions 13 of the connecting seat 10 in such way that, when the pawl unit 20 is viewed from right side of the driving device, each of the resilient members 23 is located clockwise from an adjacent one of the pawls 22 (as shown in FIG. 2 as solid line). In this mode, when a clockwise torque ($T_1$) is applied to the sprocket 12 of the connecting seat 10, the claw end 222 of each of the pawls 22 remains engaging a corresponding one of the ratchet grooves 202 of the stationary ring 2 to transfer the clockwise torque ($T_1$) onto the hub assembly 100. However, when a counterclockwise torque is applied instead, each of the pawls 22 is pushed by an adjacent one of the ratchet teeth 204 against the resilient force of a respective one of the resilient members 23 to be disengaged from the corresponding one of the ratchet grooves 202 so that the counterclockwise torque cannot be transferred onto the hub assembly 100.

Figure 4:
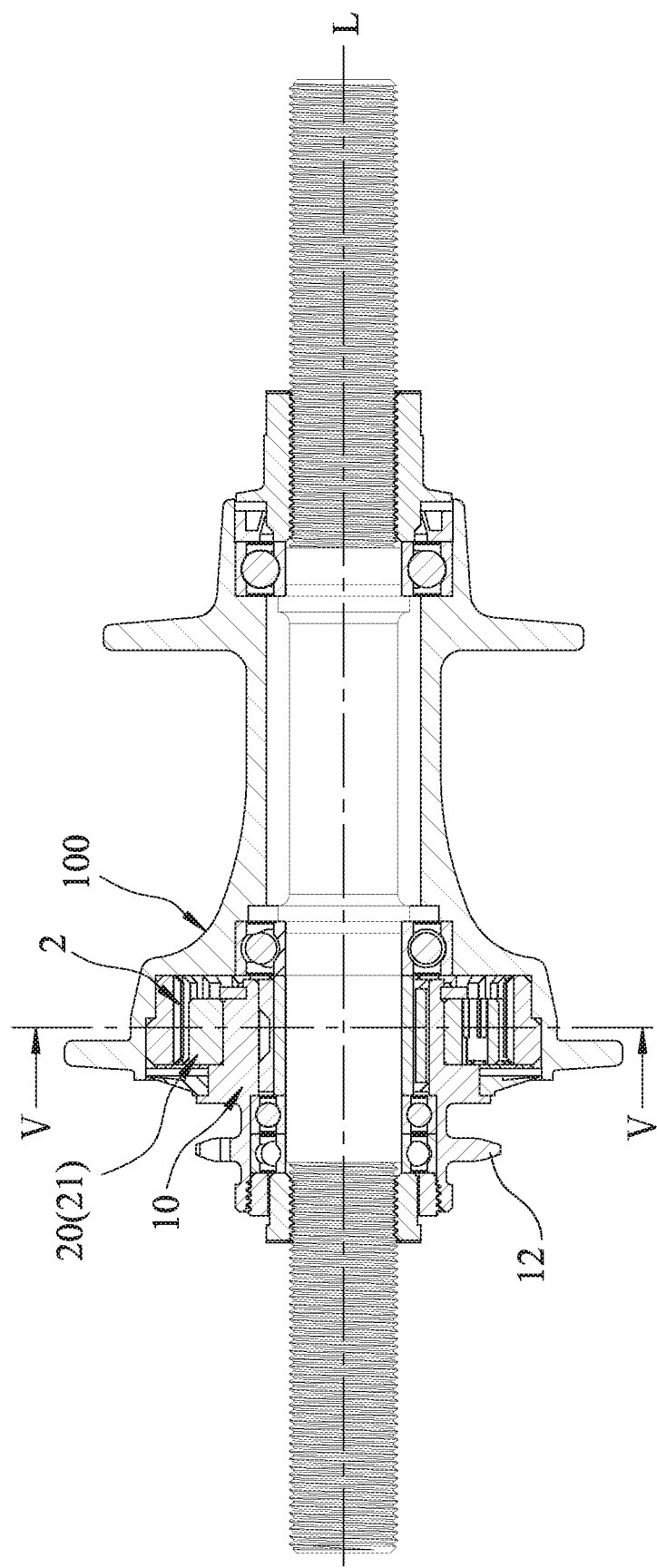
FIG. 4 is a sectional view of the embodiment mounted fixedly in the hub assembly in a left-handed drive mode.
Figure 5:
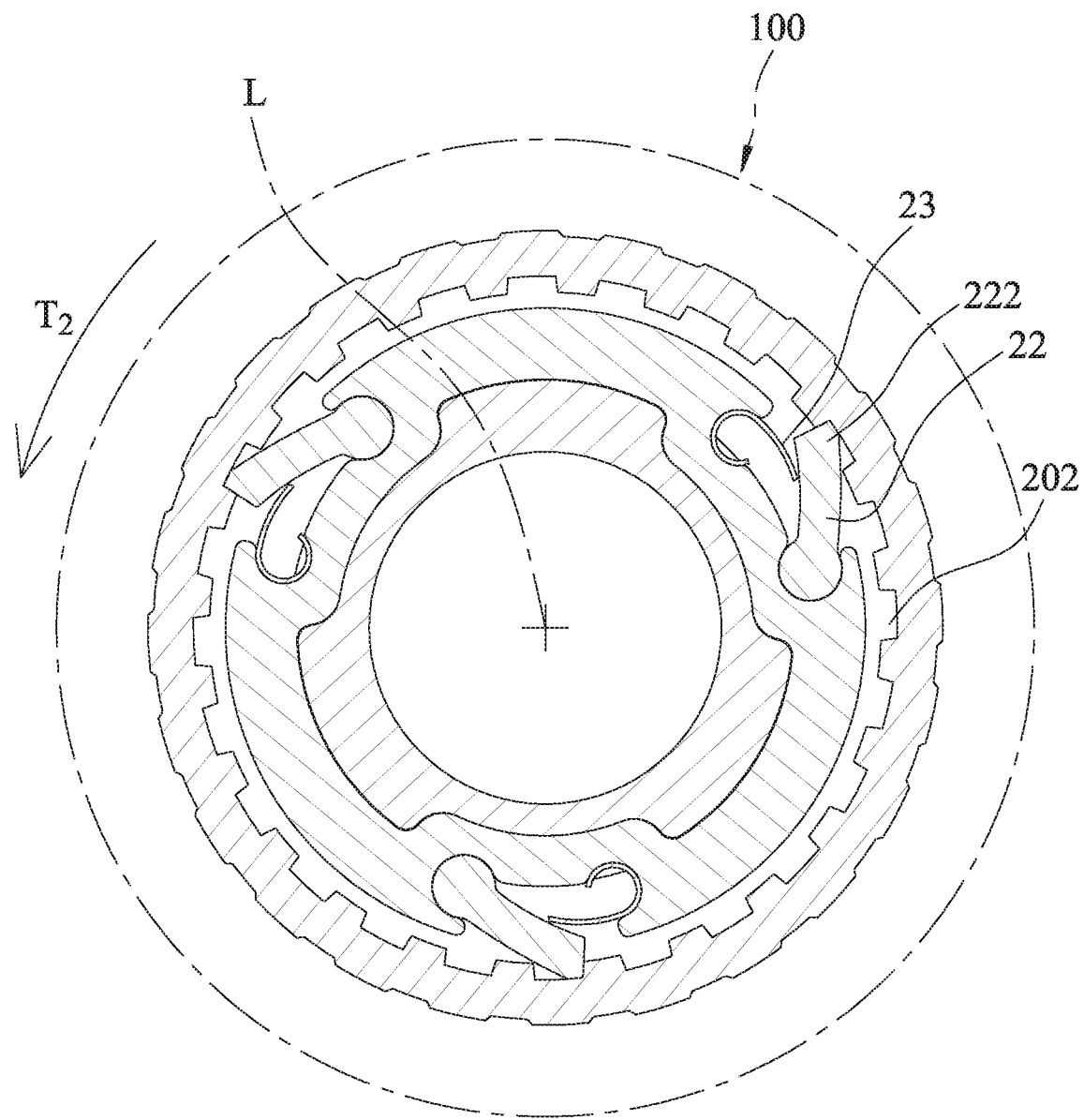
FIG. 5 is a sectional view taken along line V-V in FIG. 4.

Referring to FIGS. 4 and 5, the driving device is used in the hub assembly 100 in a left-handed drive mode. To switch from right-handed drive mode to left-handed drive mode, a user may disassemble the driving device from the hub assembly 100 and reverse the direction of the hub assembly 100 relative to the axis (L), such that the stationary ring 2 is disposed on left side of the hub assembly 100. Then, the user may disengage the pawl unit 20 from the connecting seat 10, flip the pawl unit 20 by 180 degree (as shown in FIG. 2 as imaginary line), and re-engage the pawl unit 20 with the connecting seat 10, such that when the pawl unit 20 is viewed from left side of the driving device, each of the resilient members 23 is located counterclockwise from the adjacent one of the pawls 22. In this scenario, when a counterclockwise torque ($T_2$) is applied to the sprocket 12 of the connecting seat 10, the claw end 222 of each of the pawls 22 remains engaging the corresponding one of the ratchet grooves 202 of the stationary ring 2 to transfer the counterclockwise torque ($T_2$) onto the hub assembly 100. Likewise, when a clockwise torque is applied instead, the pawls 22 no longer engage the ratchet grooves 202 to transfer the clockwise torque onto the hub assembly 100.

The abovementioned characteristics of the driving device for a hub assembly provide the following benefits:

1. Assembly of the pawl unit 20 combines the coupling seat 21 with the pawls 22 and the resilient members 23 as one piece. The pawl unit 20 is easy to maintain, as each of the working components of the pawl unit 20 is less likely to be separated apart from each other or simply lost during re-installation. When the driving device switches its drive mode, instead of having to disassemble and reassemble the pawls 22 and the resilient members 23, the coupling seat 21 of the pawl unit 20 may simply be reengaged with the connecting seat 10 in an opposite drive mode, reducing re-installation time. The pawls 22 and the resilient members 23 would also be less susceptible from damage caused by re-installation.

2. As the engaging grooves 204 of the stationary ring 2 are symmetric, the stationary ring 2 is suitable to engage with the pawl unit 20 in either one of its drive modes. As such, the stationary ring 2 does not need to be disassembled from the hub assembly 100 whenever the driving device switches its drive mode.

3. The coupling portions 212 of the coupling seat 21 of the pawl unit 20 may easily engage with the connecting portions 13 of the connecting seat 10 and transfer torque from the sprocket 12 of the connecting seat 10 smoothly.

4. Each of the coupling portions 212 of the coupling seat 21 of the pawl unit 20 is radially aligned with the respective one of the retaining grooves 214 to ensure structural stability.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A driving device adapted for use in a hub assembly, said driving device comprising:
    a stationary ring adapted to be mounted fixedly in the hub assembly, and having
        an inner ring surface that surrounds an axis and that defines an inner ring hole, and
        a plurality of angularly spaced-apart ratchet grooves that are formed in said inner ring surface and that are in spatial communication with said inner ring hole, each of said ratchet grooves having an outline that is symmetrical with respect to a plane extending from the axis through a central axis of said ratchet groove;
    a connecting seat having
        a surrounding wall that surrounds the axis and that has an outer surrounding surface,
        a sprocket that surrounds and is connected to said surrounding wall, and
        at least one connecting portion that is formed on said outer surrounding surface of said surrounding wall, said connecting portion being configured as a recess, said at least one connecting portion and said sprocket being arranged along the axis; and
    a pawl unit including
        a coupling seat that is ring-shaped, that is removably sleeved on said connecting seat, and that has
            an internal surrounding surface surrounding the axis,
            an external surrounding surface opposite to said internal surrounding surface,
            at least one coupling portion formed on said internal surrounding surface and engaging removably said at least one connecting portion of said connecting seat, said coupling portion being configured as a protrusion, and
            a plurality of angularly spaced-apart retaining grooves formed in said external surrounding surface, each of said retaining grooves having a central section that has an opening, and first and second retaining sections that are connected respectively to circumferentially opposite ends of said central section,
        a plurality of pawls, each of which has an engaging end that engages rotatably said first retaining section of a respective one of said retaining grooves of said coupling seat, and a claw end that is opposite to said engaging end and that extends through said opening of the respective one of said retaining grooves, and
        a plurality of resilient members, each of which is disposed in said second retaining section of a respective one of said retaining grooves for biasing said claw end of a respective one of said pawls to engage a corresponding one of said ratchet grooves of said stationary ring;
    wherein said connecting seat has a plurality of said connecting portions that are angularly spaced-apart from each other;
    wherein said coupling seat of said pawl unit has a plurality of said coupling portions that engage respectively said connecting portions of said connecting seat; and
    wherein each of said coupling portions of said coupling seat of said pawl unit is radially aligned with a respective one of said retaining grooves.

2. The driving device as claimed in claim 1, wherein:
    said connecting seat further has
        an abutment ring that surrounds and is connected to said surrounding wall, and that is disposed between said at least one connecting portion and said sprocket, and
        a ring groove that is formed in said outer surrounding surface of said surrounding wall and that is disposed at a side of said at least one connecting portion opposite to said abutment ring along the axis; and
    said driving device further comprises a C-ring that is removably retained in said ring groove, said pawl unit being positioned between said C-ring and said abutment ring.

* * * * *